United States Patent Office 2,741,553
Patented Apr. 10, 1956

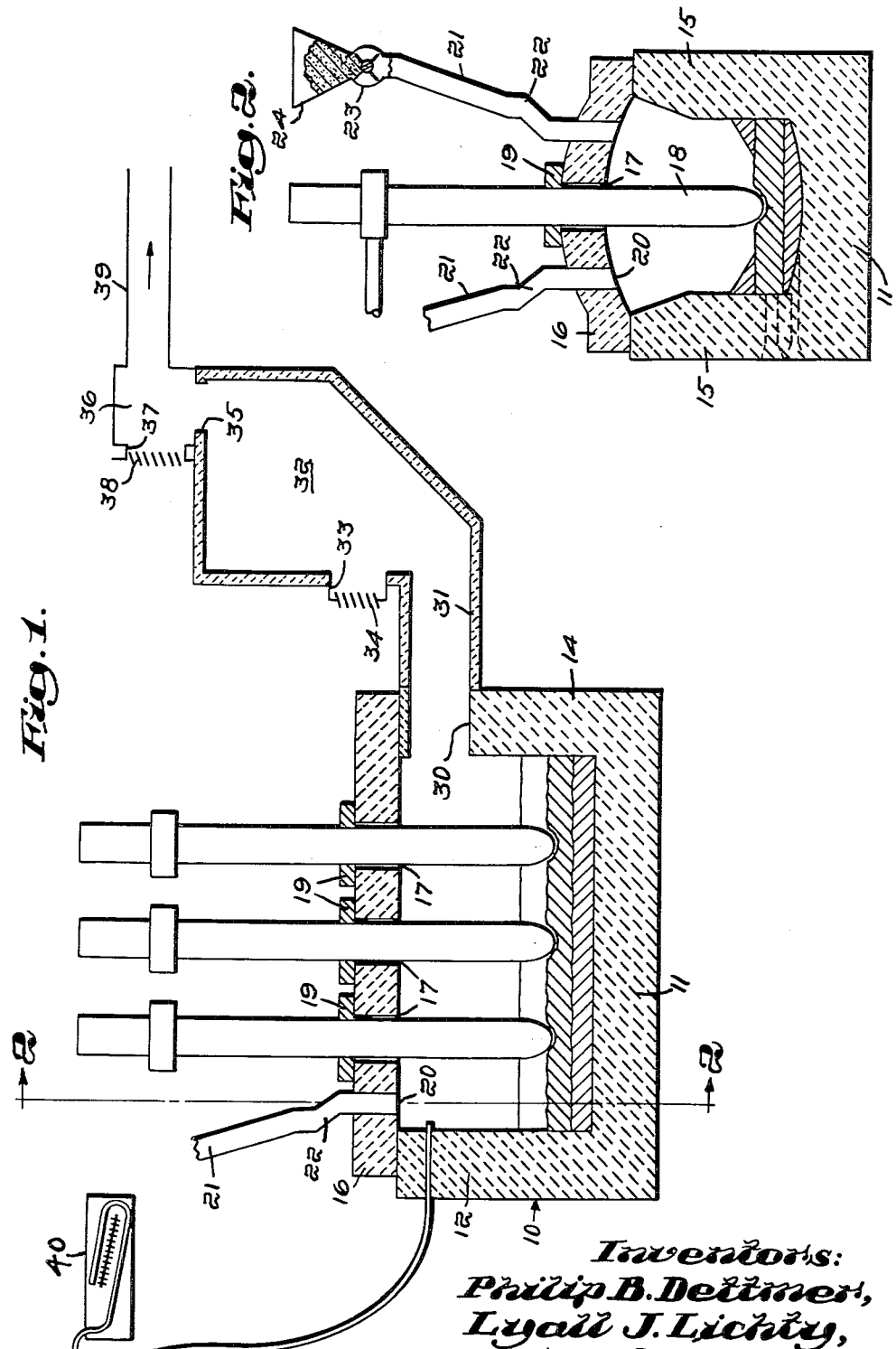

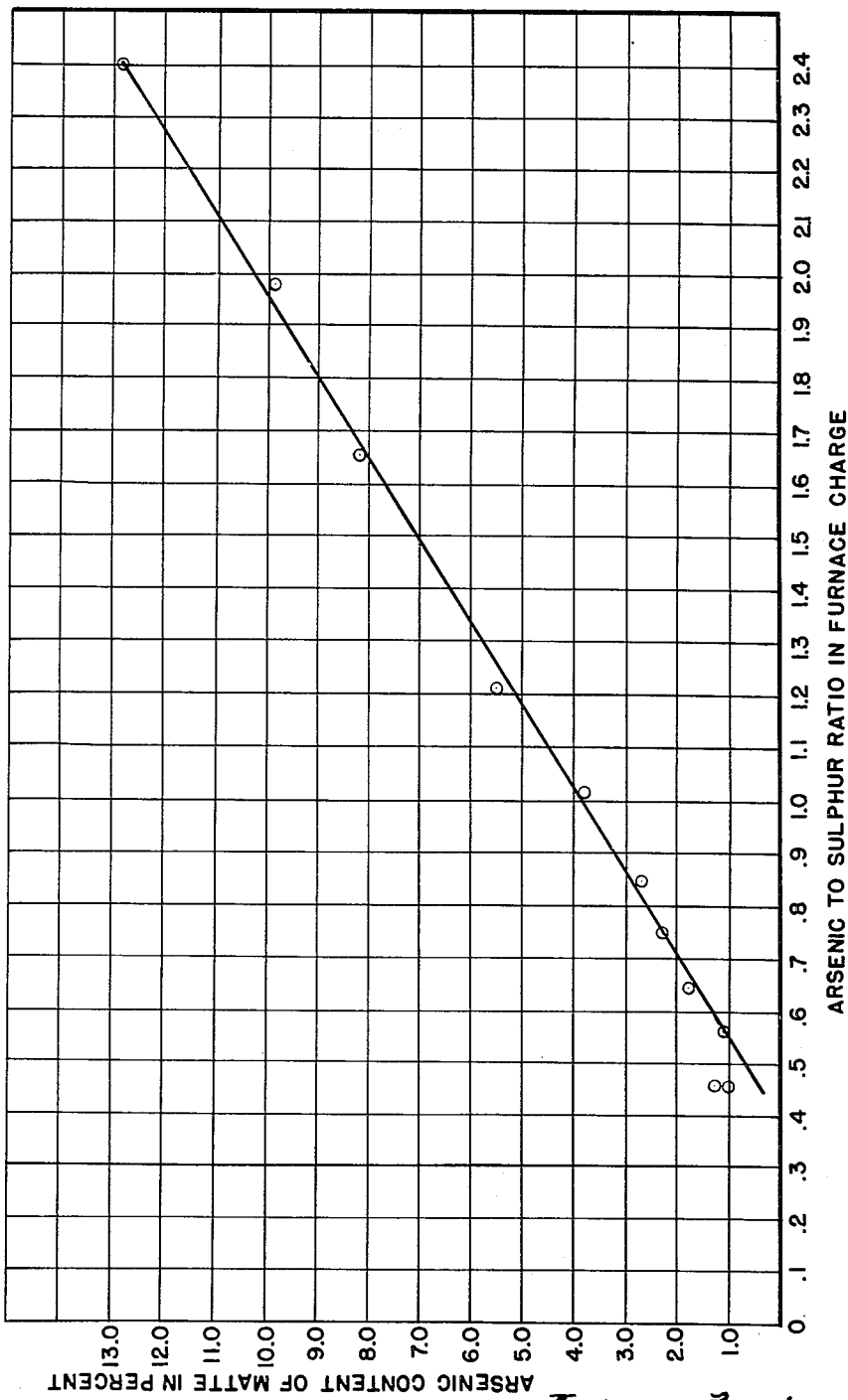

2,741,553

METHOD FOR PRODUCING A MATTE FROM ARSENICAL SULFIDE COBALT ORES

Philip B. Dettmer, Cobalt, Ontario, and Lyall J. Lichty, Ottawa, Ontario, Canada, assignors to Quebec Metallurgical Industries Limited, Ottawa, Ontario, Canada, a corporation of Canada Application November 4, 1954, Serial No. 466,743

7 Claims. (Cl. 75—10)

This invention relates to the production of a matte from a metalliferous arsenical sulfide material, such as cobalt arsenical sulfide ores, concentrates and the like, to facilitate the recovery therefrom of the metal values, such as cobalt, nickel, copper and silver, which may be present in such materials.

The presence of a substantial amount of arsenic in cobalt ores has made the recovery of the metal values, such as cobalt, nickel, copper, and silver, difficult and has required complicated and costly procedures to separate the metal values therefrom.

Nickel sulfide ores or concentrates which also may contain copper and iron but which do not contain arsenic may be smelted with a suitable flux under non-oxidizing conditions to produce a matte and slag. This matte may be treated easily by subsequent steps to recover the nickel and copper. Thus, the matte may be leached with a dilute aqueous solution of sulfuric acid to obtain a solution of sulfates of nickel, copper and iron, the hydrogen sulfide evolved causing the copper to be precipitated as copper sulfide which may be separated from the solution by filtration. Lime then may be added to the solution to reduce its pH to about 3.5 and the iron oxidized by blowing air through the solution thereby causing the iron to be precipitated as ferric hydroxide together with some calcium sulfate. The iron precipitate may be removed by filtration and the nickel easily recovered from the filtrate.

This simple procedure has not been applicable for treating cobalt ores containing substantial amounts of arsenic. Thus, if the latter material was smelted with a flux in the usual manner under non-oxidizing conditions a slag and a speiss was formed, the speiss containing substantially all of the arsenic present in the material smelted and could not be easily leached with an acid to dissolve the metal values. If the cobalt ore is roasted, substantial amounts of both arsenic and sulfur are removed as volatile oxides.

Prior to the present invention one of the most satisfactory methods for treating cobalt ores containing arsenic was that used in treating the Canadian ore of northern Ontario. In this method the crushed ore is charged into a blast furnace with coke, limestone, iron scrap and return speiss. The products of the blast furnace are speiss and slag. The blast furnace charge must contain sufficient arsenic to combine with the cobalt and nickel, otherwise the latter will pass into the slag. A typical speiss contains the following percentages: cobalt 20, nickel 12, arsenic 23, iron 18, copper 2, antimony 2, silver 2.7 and sulfur 2.

The speiss from the blast furnace is crushed and roasted to reduce the content of arsenic. The roasted product may contain 12 percent of arsenic. The roasted product then is chloridized to reduce the arsenic content to about 6-8 percent.

The water-soluble chlorides of cobalt, nickel and copper are leached out. The insoluble chlorides are purged with sulfuric acid and the mixture dumped into bins for a period of four weeks to complete sulfation. Solution of the sulfated material is carried out with air and steam agitation. The non-sulfated portion returns to the blast furnace while the solution passes to the iron-arsenic removal tanks.

Neutralization of the solution with lime to a pH of about 3.5, after oxidation of the iron, gives a precipitate of ferric arsenate, ferric hydroxide and calcium arsenate. If the pH does not exceed 3.5 most of the copper will remain in solution but at a pH of 5 a large proportion of the copper will be precipitated.

Final traces of copper are removed with scrap iron and the iron in turn is precipitated with lime. The solution containing the cobalt and nickel is then ready for the final stage precipitation of cobalt to leave nickel in solution.

The present invention contemplates the production of a matte from a metalliferous arsenical sulfide material containing slag forming constituents and such substantial amounts of arsenic that if melted without previous removal of arsenic a speiss is formed. The invention is based upon the discovery that a cobalt arsenical sulfide material, such as an ore concentrate or the like, containing a large amount of arsenic may be mixed with a suitable flux and smelted in a suitable furnace under certain conditions to form a matte and slag instead of a speiss and slag. One of these conditions is that the ratio of the arsenic content to the sulfur content in the furnace charge should fall within a certain range. It also is important to feed the charge to the furnace so the gases evolved will have no difficulty escaping. Another important condition is the maintenance of the proper atmosphere within the furnace. These conditions will be discussed fully hereinafter.

The cobalt may be extracted from the matte thus produced by a method which comprises (1) crushing the matte until at least 80 percent passes a screen containing 200 openings per square inch, (2) subjecting the crushed matte to an oxidizing roast to remove sulfur, (3) sulfating the roasted matte and subjecting it to a second roasting in the presence of air at a temperature above about 575° C. and below about 650° C. and (4) continuing the second roasting until a solution obtained by leaching with water contains a ratio of cobalt to iron at least as great as 4 to 1.

In the course of our investigations we have discovered that when smelting a cobalt arsenical sulfide material by the method of the present invention the arsenic content of the matte produced increases substantially directly with increase in the ratio of the arsenic content to the sulfur content of the furnace charge when the other of the above mentioned smelting conditions are maintained. Thus, the arsenic content of the matte produced is about 1 percent, 2 percent, 3 percent and 4 percent when the ratio of the arsenic content to the sulfur content of the furnace charge is about 0.55, 0.7, 0.85 and 1.0 respectively. When using the previously described method for extracting cobalt from the matte, the extraction of cobalt starts falling off rapidly as the arsenic content of the matte rises above 4 percent. Consequently, in the preferred practice of the present invention, the ratio of the arsenic content to the sulfur content of the furnace charge should not be substantially greater than 1 to 1. Therefore, before smelting a cobalt arsenical sulfide material containing a ratio of arsenic to sulfur greater than 1 to 1, it is desirable to blend the material with another high sulfur content material, such as a high sulfur content cobalt concentrate, to lower the ratio of arsenic to sulfur. The proper ratio of arsenic to sulfur in the furnace charge also may be obtained by adding a sulfide, such as calcium sulfide or iron sulfide, to the material containing a high ratio of arsenic to sulfur.

As previously indicated, it is important to feed the charge to the furnace so the gases evolved will have no difficulty escaping. This may be accomplished by feeding the charge through the top of the furnace adjacent a wall thereof at a controlled rate to maintain a small bank of the charge supported by the furnace wall and out of direct contact with the source of heat for heating the furnace. If the furnace is an electric furnace having electrodes, the charge should be fed so as to maintain an open molten pool around the electrodes. Good results can be obtained by sprinkling the charge upon the surface of the molten burden. By properly controlling the rate of feed of the charge, the heat radiated from the molten bath volatilizes the major portion of the arsenic content of the charge while retaining the major portion of its sulfur content before the charge melts. Consequently, when the charge melts a matte is formed.

The atmosphere within the furnace should consist essentially of the vapors evolved from the heated charge and are principally arsenic sulfide together with some sulfur and a small amount of arsenic. Optimum results can be obtained by maintaining the pressure of these vapors within the furnace slightly above atmospheric pressure. Under such conditions some of the vapors might escape and endanger the health of the plant operators. Consequently, for health reasons, the pressure of these vapors within the furnace is maintained slightly below atmospheric pressure. If the pressure of these vapors is too low, too much air will leak into the furnace and this tends to increase the arsenic content of the matte.

The pressure of the vapors within the furnace can be controlled to maintain the pressure at about atmospheric pressure or slightly less by withdrawing the vapors from the furnace at a controlled rate in any desired manner. We prefer to withdraw the vapors by the action of suction through a confined path including a combustion chamber in which the vapors are burned in the presence of air. Thus, in accordance with our preferred practice, the furnace communicates with a combustion chamber which in turn communicates with a conduit leading to a baghouse and suction fan. The vapors are withdrawn from the furnace into the combustion chamber and the combustion products are withdrawn from the combustion chamber through the conduit to the baghouse by the action of the suction fan. Air is admitted to the combustion chamber in an amount to support combustion of the hot furnace vapors through an air inlet having an adjustable damper. Air also may be admitted to the conduit through an air inlet having an adjustable damper. By properly adjusting the volume of air admitted through these air inlets, the pressure of the vapors within the furnace may be maintained at a desired pressure. The combustion products are principally arsenic trioxide and sulfur dioxide, the former being collected in the baghouse.

Any desired type of furnace may be used in the practice of the invention which is capable of being heated to form a molten bath comprising a layer of a compound of a metal and sulfur, such as cobalt matte, in the bottom of the furnace. The means for heating the furnace is such as to maintain a molten bath in the bottom portion of the furnace and to heat the charge to remove the major portion of its arsenic content before the charge melts. We presently prefer to employ an electric furnace having a plurality of spaced electrodes supplied with electrical energy from a suitable source. While we have obtained good results with the electrodes submerged in the molten bath, best results are obtained when the tips of the electrodes are positioned slightly out of contact with the surface of the molten bath so there is a slight fringe of arcing, that is, the arc blasts the molten burden away from the electrode tips.

The invention is illustrated further by the following description in conjunction with the accompanying drawings, in which:

Fig. 1 is a sectional elevational view, partly broken away, of an apparatus suitable for smelting a metalliferous material to form a matte;

Fig. 2 is a sectional view, partly broken away, taken on the line 2—2 of Fig. 1; and Fig. 3 is a diagram showing the relationship of the arsenic content of the matte produced with different ratios of arsenic content to sulfur content in the furnace charge.

In smelting a material, such as an arsenical sulfide cobalt ore or concentrate, in accordance with the present invention various types of furnaces are suitable for use, such as an electric furnace or a reverberatory furnace. In Figs. 1 and 2 of the accompanying drawings, we have illustrated a suitable electric furnace together with auxiliary apparatus which, preferably, may be associated with the electric furnace or other furnace used. The furnace 10 illustrated is a 600 kilowatt electric furnace supplied with three phase alternating current having a bottom 11, front and rear walls 12 and 14 and side walls 15 each provided with a suitable refractory lining. The top of the furnace is closed by a roof 16. The roof 16 is provided with an opening 17 for each of three electrodes 18 which may be adjusted vertically in the usual manner by means not shown. A packing gland 19 surrounds each electrode 18 to seal the opening 17. The roof 16 is provided with three passages 20 for feeding the charge into the furnace near each side wall 15 and opposite each electrode and also is provided with a charge feeding passage near the front wall 12. Each passage 20 connects with the lower end of a transite pipe 21 having an offset portion 22. The upper end of each pipe 21 connects through a rotating vane feeder 23 with a hopper 24 adapted to receive a mixture of flux and metalliferous arsenical sulfide ore or concentrate to be fed into the furnace.

The rear wall 14 of the furnace 10 is provided near its top with an outlet passage 30 for vapors evolved within the furnace and which are composed principally of arsenic sulfide. The passage 30 communicates with the inlet passage 31 of a combustion chamber 32 having a suitable refractory lining. Preferably, just above the inlet passage 31, the front wall of the combustion chamber 32 is provided with an inlet opening 33 controlled by an adjustable damper 34. The top of the combustion chamber 32 near its rear end is provided with an outlet passage 35 for combustion products which are principally arsenic trioxide and sulfur dioxide. The outlet passage 35 communicates with a chamber 36 which is provided in its front wall with an air inlet passage 37 controlled by an adjustable damper 38 for regulating the pressure of the vapors within the furnace 10. The rear wall of the chamber 36 is provided with an outlet passage which communicates with a conduit 39 leading to a baghouse and suction fan (not shown).

In the course of our investigations we discovered that when smelting a cobalt arsenical sulfide material, such as a concentrate, the arsenic content of the matte produced varied with the ratio of the arsenic content to the sulfur content of the furnace charge. This relationship is shown in Fig. 3 of the accompanying drawing in which the abscissa represent ratios of arsenic to sulfur contents of furnace charges and the ordinates represent arsenic contents of the corresponding mattes produced. The encircled points represent actual runs and provided the data for the derivation of the straight line curve. It will be noted that the arsenic content of the mattes produced increase substantially directly with increase in the ratio of the arsenic to sulfur contents of the furnace charges. As previously pointed out, it is presently preferred to obtain a matte containing not more than about 4 percent by weight of arsenic. Consequently, a furnace charge should be used in which the ratio of arsenic to sulfur content is not substantially greater than 1 to 1.

Our presently preferred apparatus is illustrated in Figs. 1 and 2. The furnace charge may consist of a mixture of a flux and a metalliferous material containing arsenic and sulfur in the previously indicated relative proportions. Power is supplied to the electrodes 18 to heat the furnace and form a molten bath having a top layer of slag. The hoppers 24 are filled with the charge and the feeders 23 are operated to feed the charge through the pipes 21 into the furnace adjacent the side walls 15. The rate of feed may be such as to sprinkle the charge upon the molten bath or at a rate to form small banks of solid charge supported by the walls 15 so that the vapors evolved may escape without difficulty. In either event, an open molten pool of slag should be maintained around the electrodes. The position of each electrode, preferably, is adjusted so that the tip of each is maintained slightly out of contact with the molten slag by a slight fringe of arcing which blasts the slag away from the electrode tip. The heat from these arcs and the heat radiated from the molten bath heats the charge to remove the major portion of its arsenic content while retaining the major portion of its sulfur content before the portions of the charge in contact with the molten bath melt to form a matte and slag. The offset portions 22 of the feed pipes 21 tend to prevent transmission of heat upward to the hoppers 24. By maintaining a supply of charge in each hopper 24, the admission of air through the feed pipes 21 is substantially prevented. The molten slag and matte is tapped off periodically through the tap holes 41 and 42 respectively in accordance with usual metallurgical practice.

During the smelting operation, the action of the suction fan in the baghouse (not shown) continuously withdraws arsenical vapors from the furnace 10 into the combustion chamber 32 where the hot vapors burn in the presence of air admitted through the damper controlled air inlet opening 33. The products of combustion are withdrawn continuously from chamber 32 through the conduit 39 to the baghouse by the action of the suction fan. The dampers 34 and 38, controlling the admission of air through the opening 33 and passage 37 respectively, are adjusted to maintain the pressure of the vapors in the furnace 10 slightly less than atmospheric pressure, a draft monometer 40 being provided for indicating this pressure. We have found that in this manner the atmosphere within the furnace is maintained essentially neutral. A strongly oxidizing atmosphere within the furnace should be avoided because the sulfur will be burned off and a high arsenic matte or speiss formed. If a strongly reducing atmosphere is maintained the arsenic will be reduced to form a speiss or enter the matte.

The invention is illustrated further by the following specific example taken from a thirty day portion of a six months continuous operation in a 600 kw., 3 phase, commercial-scale electric furnace and associated apparatus of the construction illustrated in the accompanying drawings. The furnace and associated apparatus was operated as previously described to maintain a pressure within the furnace at about atmospheric pressure but not less than about one pound less than atmospheric pressure. During this period 380,427 lbs. of arsenical material having the following average analysis was fed into the furnace.

*Average analysis of charge*

| | |
|---|---|
| Silver, 276.14 troy ounces/ton | 52,526 |
| Cobalt, 5.43 percent | 20,657 |
| Nickel, 1.66 percent | 6,315 |
| Copper, 1.64 percent | 6,239 |
| Lead, 1.15 percent | 4,374 |
| Iron, 15.69 percent | 59,689 |
| Arsenic, 13.81 percent | 52,537 |
| Sulfur, 15.95 percent | 60,678 |
| Lime, CaO, 10.00 percent | 38,043 |
| Silica, $SiO_2$, 8.00 percent | 30,434 |

The weight and assays include limestone flux which is added to the charge to maintain a slightly basic or neutral slag. The slag is preferred to be basic for greater refractory life.

The products of the furnace for the same period were:

Slag, total weight, 133,485 lbs.:

| | |
|---|---|
| Silver, 3.12 oz. per ton | 208.24 |
| Cobalt, 0.34 percent | 453.85 |
| Nickel, Nil percent | Nil |
| Copper, 0.05 percent | 66.74 |
| Iron, 5.40 percent | 7,208.19 |
| Arsenic, 0.82 percent | 1,094.58 |
| Lime, CaO, 37.00 percent | 49,389.45 |
| Silica, $SiO_2$, 35.00 percent | 46,719.75 |

Baghouse dust, total weight, 71,120 lbs.:

| | |
|---|---|
| Silver, 31.37 oz. per ton | 1,115.52 |
| Cobalt, 0.35 percent | 248.92 |
| Nickel, 0.14 percent | 99.56 |
| Copper, 0.14 percent | 99.56 |
| Lead, 1.37 percent | 974.34 |
| Iron, 1.39 percent | 988.57 |
| Arsenic, 64.33 percent | 45,751.50 |
| Sulfur, 0.50 percent | 355.60 |

Matte, total weight, 176,000 lbs.:

| | |
|---|---|
| Silver, 575.0 oz. per ton | 50,600 |
| Cobalt, 11.3 percent | 19,888 |
| Nickel, 3.48 percent | 6,124.8 |
| Copper, 3.42 percent | 6,019.2 |
| Iron, 29.18 percent | 51,353.1 |
| Arsenic, 3.8 percent | 668.8 |
| Sulfur, 28.50 percent | 50,160.0 |

The percentage recovery of metal values in the matte were as follows:

| | |
|---|---|
| Silver | 96.33 |
| Cobalt | 96.27 |
| Nickel | 96.98 |
| Copper | 96.47 |

We claim:

1. The method for producing a matte from a material comprising cobalt and an amount of arsenic such that if the material is melted without previous removal of arsenic a speiss is formed which comprises forming a furnace charge in which the ratio of arsenic to sulfur is not substantially greater than 1 to 1 and which comprises said material, forming a molten bath comprising a layer of a compound comprising cobalt and sulfur in the bottom of a furnace, supplying heat to the furnace from a source to maintain said bath molten, feeding the charge into the furnace upon said bath while maintaining the charge out of direct contact with said source to heat the charge and remove the major portion of the arsenic content from the charge before the charge is melted, controlling said feeding of the charge at a rate to permit the vapors evolved to escape therefrom, and withdrawing the vapors evolved from the heated charge at a controlled rate to maintain an atmosphere within the furnace consisting essentially of said vapors under a pressure of about atmospheric pressure.

2. The method for producing a matte from a material comprising cobalt and an amount of arsenic such that if the material is melted without previous removal of arsenic a speiss is formed which comprises forming a furnace charge in which the ratio of arsenic to sulfur is not substantially greater than 1 to 1 and which comprises said material, forming a molten bath comprising a layer of a compound comprising cobalt and sulfur in the bottom of a furnace, supplying heat to the furnace from a source to maintain said bath molten, feeding the charge into the furnace upon said bath while maintaining the charge out of direct contact with said source to heat the charge and remove the major portion of the arsenic content from the charge before the charge is melted, controlling said feeding of the charge at a rate to permit the vapors evolved to escape therefrom, withdrawing from the furnace by the action of suction the vapors evolved from the heated charge through a confined path including a combustion chamber for said vapors, and admitting air into said path at a controlled rate to control and maintain the pressure of said vapors in said furnace at about atmospheric pressure.

3. The method for producing a matte from a material comprising cobalt and an amount of arsenic such that if the material is melted without previous removal of arsenic a speiss is formed which comprises forming a furnace charge in which the ratio of arsenic to sulfur is not substantially greater than 1 to 1 and which comprises said material, forming a molten bath comprising a layer of a compound comprising cobalt and sulfur in the bottom of an electric furnace heated by electric energy supplied by spaced electrodes, feeding the charge into the furnace above said bath while maintaining an open molten pool around said electrodes to remove the major portion of the arsenic content from the charge before the charge melts, and withdrawing the vapors evolved from the heated charge at a controlled rate to maintain an atmosphere within the furnace consisting essentially of said vapors under a pressure of about atmospheric pressure.

4. The method as described by claim 3 wherein the tips of said electrodes are positioned slightly out of contact with the surface of said molten bath.

5. The method for producing a matte from a material comprising cobalt and an amount of arsenic such that if the material is melted without previous removal of arsenic a speiss is formed which comprises forming a furnace charge in which the ratio of arsenic to sulfur is not substantially greater than 1 to 1 and which comprises said material, forming a molten bath comprising a layer of a compound comprising cobalt and sulfur in the bottom of an electric furnace heated by electric energy supplied by spaced electrodes, feeding the charge into the furnace above said bath while maintaining an open molten pool around said electrodes to remove the major portion of the arsenic content from the charge before the charge melts, withdrawing from the furnace by the action of suction the vapors evolved from the heated charge through a confined path including a combustion chamber for said vapors, and admitting air into said path at a controlled rate to control and maintain the pressure of said vapors in said furnace at about atmospheric pressure.

6. The method as described by claim 5 wherein the tips of said electrodes are positioned slightly out of contact with the surface of said molten bath.

7. In a method for producing a matte from a material comprising cobalt and sulfur together with an amount of arsenic such that if the material is melted without previous removal of arsenic a speiss is formed and wherein the material is heated in a furnace to remove the major portion of its arsenic content before the material is melted and wherein the material thereafter is melted to form a matte, the improvement which comprises the step of forming the furnace charge comprising said material and wherein the ratio of arsenic to sulfur is not substantially greater than 1 to 1.

References Cited in the file of this patent

UNITED STATES PATENTS

| | | |
|---|---|---|
| 1,034,788 | Greene | Aug. 6, 1912 |
| 1,790,088 | Brennan | Jan. 27, 1931 |
| 1,819,238 | Greene | Aug. 18, 1931 |